(12) United States Patent
Kelly

(10) Patent No.: US 6,572,086 B2
(45) Date of Patent: Jun. 3, 2003

(54) EXTERNAL CUSHION PROTECTOR FOR BUMPER OF A PARKED VEHICLE

(76) Inventor: Junior Kelly, c/o Inner-City Mortgages, 1865 Flatbush Ave., Brooklyn, NY (US) 11210

( * ) Notice: Subject to any disclaimer, the term of this patent is extended or adjusted under 35 U.S.C. 154(b) by 36 days.

(21) Appl. No.: 09/930,018

(22) Filed: Aug. 15, 2001

(65) Prior Publication Data

US 2003/0034660 A1 Feb. 20, 2003

(51) Int. Cl.7 ................................................ F16M 9/00
(52) U.S. Cl. ..................... 267/136; 267/139; 280/770; 293/142; 296/136
(58) Field of Search ................................. 293/117, 142, 293/143; 296/136; 150/166; 280/770; 267/136, 139, 140, 140.11, 142

(56) References Cited

U.S. PATENT DOCUMENTS

| | | | |
|---|---|---|---|
| 3,378,296 A | | 4/1968 | Crocker |
| 4,313,987 A | * | 2/1982 | McCormick ............... 156/249 |
| 4,796,935 A | | 1/1989 | Maraia |
| 5,072,979 A | | 12/1991 | Swinton |
| 5,129,695 A | | 7/1992 | Norman, II |
| 5,156,425 A | | 10/1992 | Wagner |
| 5,267,763 A | | 12/1993 | Klein |
| 5,320,392 A | | 6/1994 | Hart |
| 5,399,393 A | | 3/1995 | Zoller |
| 5,518,283 A | | 5/1996 | Elgelske |
| 5,618,073 A | | 4/1997 | Criscione |
| 5,641,547 A | | 6/1997 | Dilley |
| 5,810,406 A | | 9/1998 | Reid, Jr. |
| 6,010,169 A | | 1/2000 | Cox et al. |

* cited by examiner

*Primary Examiner*—Pam Rodriguez
(74) *Attorney, Agent, or Firm*—Schweitzer Cornman Gross & Bondell LLP

(57) ABSTRACT

A portable cushion protector which is easily attachable to and detachable from the rear portions of an automobile and which protects its rear bumper from scratches and other damage while it is parked. The cushion protector has supporting mechanisms which may be advantageously attached to the automobile trunk for holding the cushion securely in place upon the bumper.

2 Claims, 3 Drawing Sheets

EXTERNAL CUSHION PROTECTOR FOR BUMPER OF A PARKED VEHICLE

FIELD OF THE INVENTION

The present invention relates generally to automobile bodies and specifically to a new and improved portable, collapsible cushion protector which is easily attachable to and detachable from the rear portions of an automobile for covering and protecting the rear bumper of a parked automobile from scratches and other damage.

BACKGROUND OF THE INVENTION

Significant developments have been made in the field of automobile body design. For example, many automobile bodies now have "crumple zones" for absorbing a substantial portion of the kinetic energy of colliding vehicles in order to provide additional protection to passengers. Many automobile bodies are now composed of lightweight materials, e.g., aluminum composites, to improve fuel efficiency and to enhance the handling and performance of the vehicles. An unfortunate drawback of such developments, even though the bodies are safer, is that the bodies have also become somewhat fragile. Body damage may now result from light collisions, often requiring expensive repairs.

The bumpers of modern automobile bodies have similarly become more fragile, a result of changes to their configuration. Earlier bumpers were generally heavy metallic structures often with thick rubber outer layers for protecting automobile bodies from all light collisions, e.g., a collision between a parked automobile and an adjacent parking automobile. In contrast, modern bumpers are relatively lightweight and are largely non-metallic. A modern bumper may comprise an inner core of an expanded polystyrene thermoplastic foam material and a thin rubber and/or plastic outer shell layer.

Additional "improvements" have been made to modern automobile bumpers. Whereas earlier front and rear bumpers were typically clearly distinguishable from the respective front and rear regions of automobile bodies, modern bumpers are often less distinguishable therefrom because they are integrated into the overall body designs. Some modern bumpers even comprise internal structures housed within the envelope of the front and rear regions of automobile bodies. A dent or other deformation in such a bumper is now likely to affect the "lines" of the body, in turn giving the appearance of body damage to the vehicle (as opposed to the appearance of damage to only the bumper of an earlier vehicle).

In further contrast with the earlier bumpers having thick black rubber outer layers, the outer layers of modern bumpers are typically painted to match the overall color schemes of automobile bodies. Even a soft strike or scrape against a modern bumper can damage the paint thereon. As a result, the paint job of the overall vehicle may appear flawed. However, it is likely that the same soft strike would have been entirely absorbed by earlier bumpers without any damage thereto. In addition, whereas a blemish on an earlier bumper was relatively inconspicuous, a blemish on a painted bumper is now more noticeable.

An automobile is particularly susceptible to bumper damage while parking and, as often as not, while parked and left unattended in a parking lot. A parked automobile may be stricken by another vehicle which parks adjacent to it. Even light strikes may damage modern bumpers, whereas earlier bumpers would have been invulnerable to such strikes. For individuals who try to maintain their automobiles in immaculate condition, these strikes are very frustrating occurrences. Thus there is a need for a means of providing reliable protection to modern automobile bumpers.

Earlier proposed protectors are disclosed in the prior art. U.S. Pat. No. 5,072,979 to Swinton discloses a protective structure with magnets for securing the structure to an automobile side panel. The protective structure remains attached to an automobile when it is driven. U.S. Pat. No. 3,378,296 to Crocker discloses a vehicle bumper cushion with hook members for clamping and securing the cushion to a bumper, which cushion remains attached to an automobile when it is driven. U.S. Pat. No. 5,618,073 to Criscione discloses a fabric or leather automobile bumper protector for shielding a rear bumper. The Criscione protector, which remains attached to an automobile when it is driven, is held in place across the rear bumper by straps which are looped through specially configured external attachment handles affixed to each of the automobile's rear wheel wells. Thus the automobile requires modification; specifically, the handles must be permanently mounted within the wheel wells, e.g., by the use of sheet metal screws. The location of the handles leaves little room for a user's fingers to manipulate the straps thereon.

SUMMARY OF THE INVENTION

The present invention comprises an improved external cushion protector for automobile bumpers and for the surrounding portions of automobile bodies. It is more quickly, more easily, and more safely attachable to and detachable from a parked automobile. The improved cushion protector of the present invention is specially configured for parked automobiles, especially the rear bumpers thereof, and fits the bumpers of most makes and models of modern automobiles without modification to their bodies. It is portable, is easily stored, and is easily and quickly attached to and detached from an automobile body. Because the cushion protector is not designed to remain attached to a vehicle when it is driven, the protector has securing means (for securing the protector upon an automobile) which advantageously are not required to hold the protector to the vehicle as tightly as other designs, e.g., the Criscione device. The securing means of the present protector are thus especially easily and quickly attached to the automobile. The protector includes no components which might otherwise remain visible after the protector is detached from the vehicle. In a preferred embodiment, the cushion protector is collapsible in order to allow still simpler and less conspicuous storage and transport and to occupy less space inside an automobile trunk when not in use.

As a very important aspect of the present invention, the securing means include supporting mechanisms specially configured for attachment to the trunk or hatch space of a parked automobile. (Hereinafter, the phrase "trunk door" encompasses hatch doors, tailgates, and the like for respective automobiles of different types.) The supporting mechanisms advantageously provide the function of supporting the weight of the cushion in order to hold the cushion securely upon the rear bumper. The supporting mechanisms are advantageously attached to the rear portions of a parked automobile in a manner which prevents the removal of the protector unless and until the trunk door is opened (presumably by an authorized user of the vehicle). The cushion is preferably composed of three interconnected segments of a rigid material, and the supporting mechanisms are preferably flexible. The cushion may also be configured to protect regions of the automobile body in addition to the bumpers, e.g., regions of the body proximate the front and rear bumpers.

DETAILED DESCRIPTION OF PREFERRED EMBODIMENTS

Figure 1:
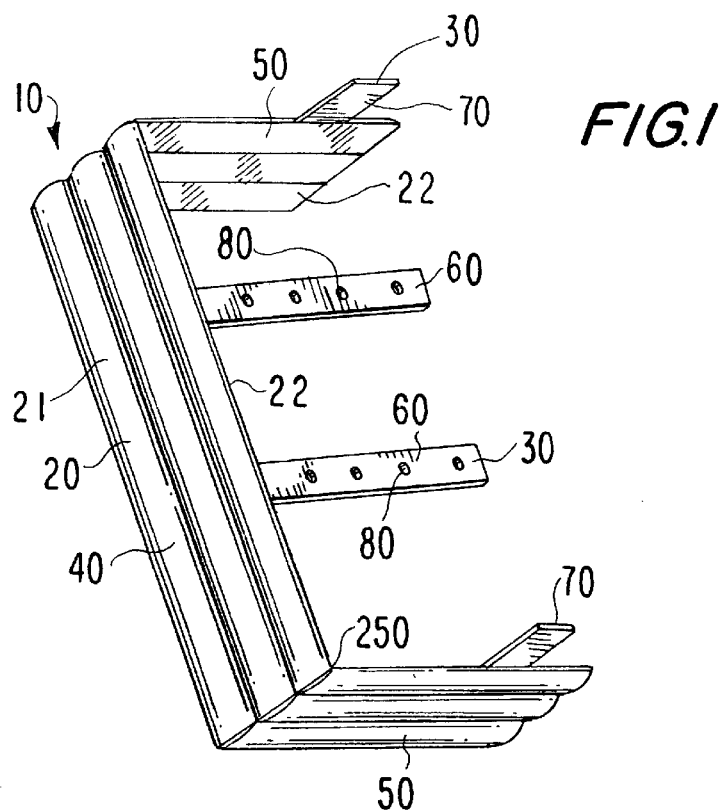
FIG. 1 is a perspective view of the cushion protector of the present invention.

As shown in FIG. 1, the cushion protector of the present invention, designated generally by reference numeral 10, includes a body portion 20 (or cushion) and securing means 30. The body portion 20 has an outer wall 21 and an inner wall 22. The body portion 20 is preferably composed of three individual segments of lightweight polystyrene thermoplastic foam or plastic material having a cross-sectional shape such as the curved shape shown. The depth of the foam material is preferably between approximately one and five inches, but may also exceed this range in either direction. A layer of soft cushioning (not shown) may be fastened to the inner wall and/or outer wall of the body portion to provide additional protection to the automobile body. In the embodiment of FIG. 1, the body portion 20 includes three interconnected individual structures, namely a central section 40 and two flaring side sections 50. The side sections 50 are attached to the central section 40 by hinges 250 for allowing the angle between each side section 50 and the central section 40 to be adjusted, thus permitting a user to conform the shape of the overall body portion 20 of the cushion protector 10 to the bumper of most automobile bodies. The hinges 250 also permit the collapsing of the body portion 20 into a flat structure. The side sections may further be advantageously configured to be removable from the central section.

The securing means 30 preferably include two supporting mechanisms 60 as well as two magnetic strips 70. The supporting mechanisms 60 are specially configured to support the weight of the cushion in order to hold the cushion securely upon the desired region of an automobile, typically its rear bumper. When the protector is in use, the supporting mechanisms 60 are gripped securely by the trunk of the automobile.

Figure 2:
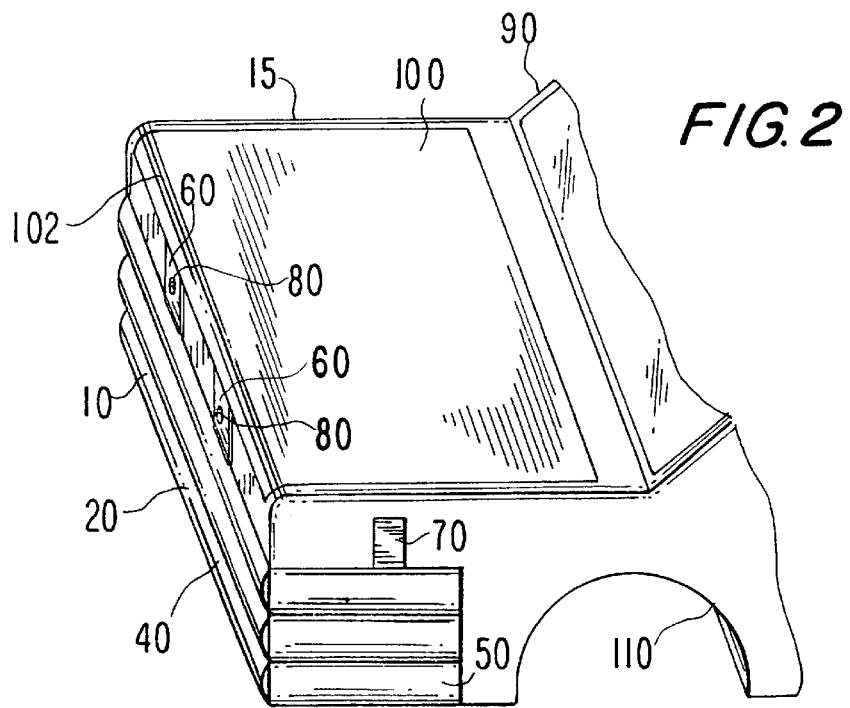
FIG. 2 is a perspective view of the cushion protector of FIG. 1 attached to the rear region of an automobile.

FIG. 2 shows the cushion protector 10 attached to the rear portions 15 of an automobile 90. One method of attaching the cushion protector 10 to the automobile 90 comprises a 4-step procedure, which is hereinafter described for attachment to the rear bumper. First, the rear trunk door 100 is opened. Second, while the trunk door 100 is ajar, the supporting mechanisms 60 are placed beneath the rear lip 102 of the door. Third, the trunk door 100 is shut on top of the supporting mechanisms 60 in order to pinch the supporting mechanisms between the rear lip 102 of the trunk door 100 and the automobile body. Fourth, the body portion 20 of the cushion is lowered onto the desired region of the automobile (i.e., its rear bumper), and the magnetic strips 70 are attached to the automobile body proximate the wheel wells 110—but advantageously not within the wheel wells 110. It can be appreciated that the supporting mechanisms 60 and the magnetic strips 70 of the present invention are very easily and quickly attached to the automobile body.

The supporting mechanisms 60 are advantageously pinched between the trunk door 100 and a trunk seal, which is typically a rubber seal on the automobile body and which lies flush against the trunk door when closed. This grip is sufficiently tight to hold the supporting mechanisms 60 securely, which in turn support almost all the weight of the cushion. Moreover, when the body portion 20 of the cushion protector 10 is stricken, the supporting mechanisms 60 are seldom released by the trunk door, instead continuing to hold the cushion in place. Because the trunk seal is generally flexible, e.g., comprised of rubber, its shape conforms to the supporting mechanisms 60 to prevent water from entering the trunk chamber while the cushion protector is attached to the automobile. The supporting mechanisms 60 are preferably thin and flexible in order to prevent harm to and deformation of the flexible trunk seal. Thus the flexible seal returns to its original shape after the supporting mechanisms 60 are removed from the trunk, and the seal thus continues to prevent water from entering the trunk.

Figure 3:
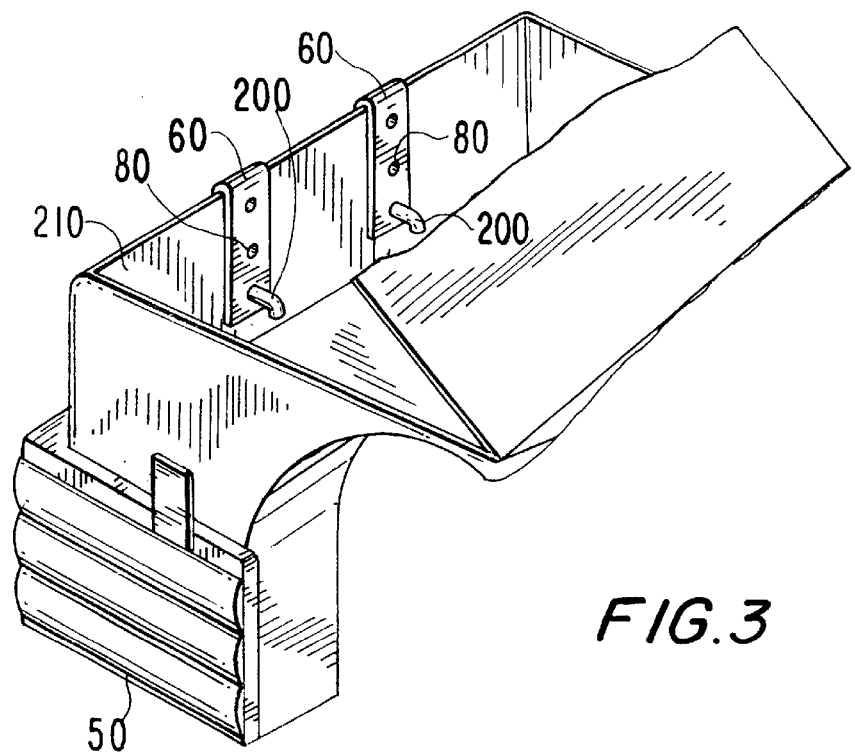
FIG. 3 is a perspective view of the cushion protector of FIG. 1 attached to the rear region of an automobile, wherein the trunk door of the automobile is ajar.

As shown in FIG. 3, the mounting configuration of the cushion protector 10 in a preferred embodiment comprises supporting mechanisms 60 having apertures 80 engageable by hooks or the like, which may be mounted within an automobile trunk for removable insertion into the apertures. Specifically, two hooks 200 are mounted semi-permanently to the inner rear wall 210 of a trunk, e.g., by screws (not shown). The hooks are advantageously unnoticeable when the trunk door is shut. A supporting mechanism 60 may be easily attached to a hook 200 by inserting the hook into a respective aperture 80 along the supporting mechanism 60. When the cushion is thereafter attached to the bumper, the hooks provide additional support for securing the cushion as well as for holding the cushion over the bumper in a collision. The supporting mechanisms may advantageously remain attached to the hooks as the cushion is transported inside the trunk, further facilitating and increasing the speed of the process of attaching and detaching the cushion. Several apertures 80 are provided along each supporting mechanism 60 for allowing the effective length of the supporting mechanisms to be adjusted, permitting the cushion to be adapted to many different sizes and styles of automobile bodies. Once the desired aperture is selected and mounted to a hook, the cushion is conveniently attached to and detached from the bumper many times without any need for further adjustment to the position of attachment, and without removing the supporting mechanisms from the hooks. Therefore, as a further advantage of the present mounting configuration, the cushion does not require repositioning over the bumper each time it is attached thereto.

Figure 4:
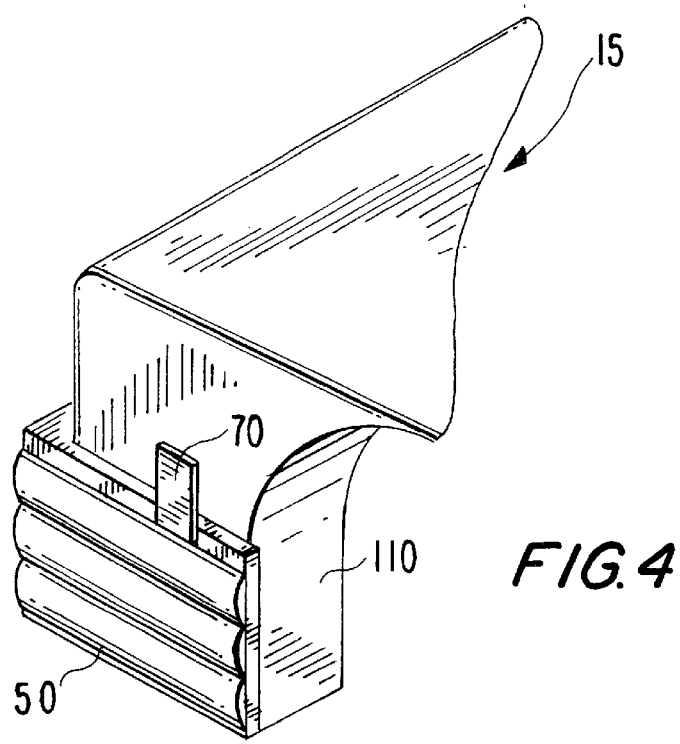
FIG. 4 is a perspective view of the cushion protector of FIG. 1 attached to the rear region of an automobile.
Figure 5:
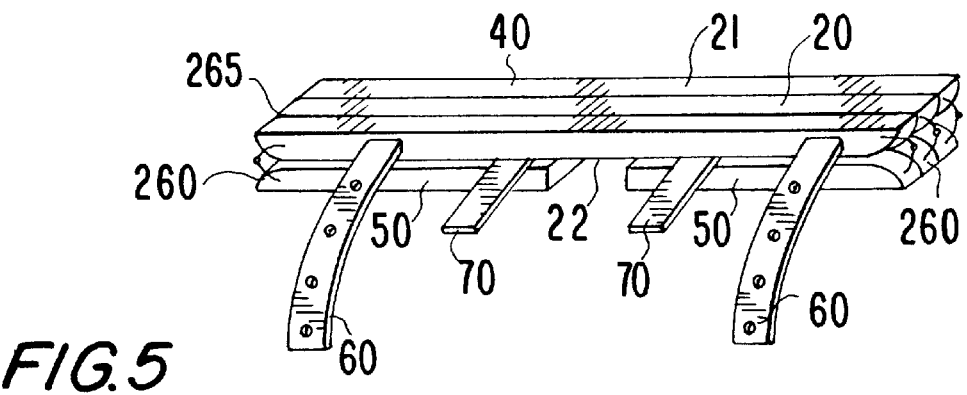
FIG. 5 is a perspective view of the cushion protector of FIG. 1 folded into a collapsed and flat unit for easy transport.
Figure 6:
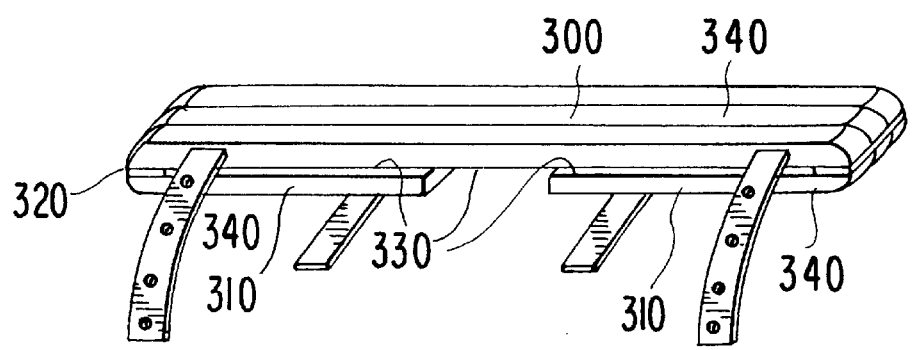
FIG. 6 is a perspective view of an alternate embodiment of the cushion protector of FIG. 1 folded into a collapsed and flat unit for easy transport, wherein the sections of the protector are fastened to each other with webbing.
Figure 7:
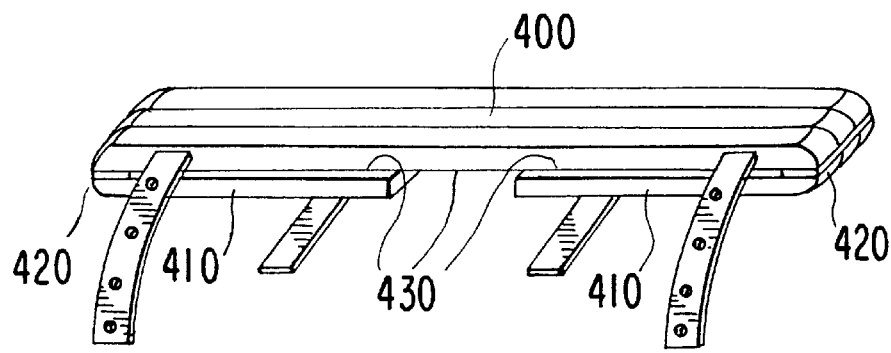
FIG. 7 is a perspective view of an alternate embodiment of the cushion protector of FIG. 1 folded into a collapsed and flat unit for easy transport, wherein the sections of the protector are fastened to each other with external mechanical fasteners.

As shown in FIG. 4, the side sections 50 of the cushion are enlarged to cover additional regions of the automobile body proximate the bumper to provide additional protection to the body. The side sections are also collapsible for easy storage in the trunk of an automobile. Specifically, hinged connections between the central section 40 and each respective side section 50 allows the side sections to collapse, providing a flat structure which is easily transported. FIG. 5 shows the side sections 50 of the cushion in such a folded position, wherein each side section has a mitered edge 260 attached to a respective mitered edge 265 of the central section by hinges 250. The hinges 250 are advantageously positioned between the central section 40 and the respective side section 50 in a manner that prevents the hinges 250 from contacting the automobile body and otherwise potentially causing damage to the body in a collision. FIG. 6 shows an alternate embodiment of the cushion protector in a folded position, in which the side sections 310 of the cushion are attached to the central section 300 with webbing 320, e.g., nylon webbing, attached to the outer wall 330 of each respective section by an adhesive such as epoxy. In contrast with the embodiment of FIG. 5, the embodiment of FIG. 6 is collapsed by folding the side sections outwardly by approximately 270 degrees, rather than inwardly by approximately 90 degrees. The webbing 320 in FIG. 6 may instead be attached to the inner wall 340 of each section of the cushion, whereby the protector would collapse by folding the side sections inwardly and the mitered edges of each section would prevent the side sections from folding outwardly. FIG. 7 shows a further alternate embodiment of the cushion protector in a folded position, in which the side sections 410 are attached to the central section 400 by external mechanical fasteners, such as external hinges 420 (which appear "internal" in FIG. 7 because the cushion is folded and the outer wall 430 of each side section 410 is in contact with the outer wall of the central section 400). The embodiment of FIG. 7 may be easily collapsed by folding the side sections 410 of the protector outwardly by approximately 270 degrees, in a manner similar to that in the alternate embodiment of FIG. 6.

The central and side sections of the cushion can be individually sized and shaped to fit snugly onto the front and rear regions of automobiles of virtually all shapes and sizes. The cushion can also comprise a pneumatic, inflatable structure, or preferably three interconnected inflatable structures (a central section and two side sections) flexibly connected to each other, e.g., by webbing. The inflatable structure is very lightweight and portable when it is deflated. A portable electric pump may be used for inflating the pneumatic structure and may be conveniently powered by the automobile battery via the automobile's cigarette lighter. The cushion 20 may further include a centrally disposed portion formed from a transparent polymer, which portion provides visual access to a license plate that is positioned in a recess within the bumper. It is also contemplated that the cushion protector of the present invention may be used to protect other portions of a vehicle, e.g., their front bumpers, as well as portions of other types of vehicles, e.g., motorboats while they are docked.

It can be appreciated that the many non-metallic components of the cushion are not susceptible to rust, and that the cushion is sufficiently durable and elastic to provide considerable protection to the automobile body. The cushion is moreover simple and economical to manufacture, and can be manufactured from off-the-shelf components.

While preferred embodiments of the external cushion protector of the present invention have been disclosed for illustrative purposes, those who are skilled in the art will appreciate that various modifications, additions and substitutions are possible, without departing from the scope and spirit of the cushion protector as set forth in the accompanying claims.

I claim:

1. A protective cushion protector for easy attachment to and detachment from rear portions of an automobile, comprising:

(a) a rigid cushion composed of a polystyrene thermoplastic foam material;

(b) securing means attached to the cushion, wherein the securing means include at least one supporting mechanism for releasable attachment to the automobile and for supporting the cushion over a rear bumper of the automobile;

(c) said securing means include two flexible supporting mechanisms;

(d) said cushion has a central section and two flaring side sections; wherein each flaring side section is connected to the central section by a hinge in the form of webbing;

(e) the securing means further include two magnetic strips, wherein each magnetic strip is attached to a single respective side section of the cushion for securely attaching the respective side section to the automobile;

(f) wherein each of the supporting mechanisms has at least two apertures for removable attachment to interior hooks; and (g) wherein the securing means include hooks for semi-permanent attachment to an inner rear wall of an automobile trunk for releasable engagement of the supporting mechanisms.

2. The cushion protector of claim 1, wherein the supporting mechanisms are composed of a fabric.

\* \* \* \* \*